(12) United States Patent
Wass et al.

(10) Patent No.: US 6,260,570 B1
(45) Date of Patent: Jul. 17, 2001

(54) PUNCTURE DISC RAFT INFLATION VALVE HAVING A ONE-PIECE VALVE BODY

(76) Inventors: Lloyd G. Wass, 1670 Blackhawk Cove, Eagan, MN (US) 55122; Kurt Drewelow, Rte. 2 - Box 1016, Aitkin, MN (US) 56431

(*) Notice: Subject to any disclaimer, the term of this patent is extended or adjusted under 35 U.S.C. 154(b) by 0 days.

(21) Appl. No.: 09/098,176

(22) Filed: Jun. 16, 1998

Related U.S. Application Data

(60) Provisional application No. 60/049,702, filed on Jun. 16, 1997.

(51) Int. Cl.[7] .......................................... B67D 5/00
(52) U.S. Cl. .............................. 137/68.3; 222/5; 441/41; 441/93
(58) Field of Search ........................ 137/68.3; 222/5; 441/41, 93

(56) References Cited

U.S. PATENT DOCUMENTS

| | | | |
|---|---|---|---|
| 1,671,369 | * | 5/1928 | Johann ........................ 222/5 |
| 1,704,944 | * | 3/1929 | Johann ...................... 137/68.3 X |
| 1,921,411 | * | 8/1933 | Johann ...................... 137/68.3 X |
| 1,924,868 | * | 8/1933 | Lovekin ..................... 137/68.3 X |
| 2,120,248 | | 6/1938 | Hinchman . |
| 3,014,619 | | 12/1961 | Moran . |
| 3,175,790 | * | 3/1965 | Reffell ........................ 441/93 X |
| 3,180,524 | * | 4/1965 | Shepard et al. ................. 222/5 |
| 3,266,668 | * | 8/1966 | Davis ........................... 222/5 |
| 3,526,339 | * | 9/1970 | Bernhardt et al. ............... 222/5 |
| 3,547,165 | * | 12/1970 | Butterworth .................... 222/5 |
| 3,648,898 | * | 3/1972 | Day ............................ 222/5 |
| 3,757,371 | | 9/1973 | Martin . |
| 3,815,783 | | 6/1974 | Hirata . |
| 3,820,607 | * | 6/1974 | Miley ........................ 222/5 X |
| 3,887,108 | * | 6/1975 | McDaniel et al. ............. 222/5 X |
| 3,934,292 | * | 1/1976 | Mulderrig .................... 222/5 X |
| 3,938,704 | | 2/1976 | Milgram . |
| 4,267,944 | | 5/1981 | Mackal . |
| 4,356,936 | * | 11/1982 | Legris ......................... 222/5 |
| 4,475,664 | | 10/1984 | Mackal . |
| 4,959,034 | * | 9/1990 | Wass ......................... 441/41 |
| 5,333,756 | * | 8/1994 | Glasa .......................... 222/5 |

* cited by examiner

*Primary Examiner*—John Rivell
(74) *Attorney, Agent, or Firm*—John Vasuta

(57) ABSTRACT

A raft inflation valve includes a one-piece valve body which is connected to a pressure vessel and which has an inlet communicating with the pressure vessel, a recess for receiving a cartridge having a puncture disc, and a passage which connects the inlet and the recess and which is covered by the puncture disc. The cartridge includes a disc retainer holding the puncture disc in position to block the passage in the valve body, and a bayonet having a cuffing edge which is biased by a spring toward the puncture disc but prohibited from such motion by a ball/link pin held in place by the pull cable ball until the cable is pulled. Once the cable has been pulled to remove the ball, the bayonet is driven by the bias force toward the disc to clearly cut and puncture the disc and permit flow of gas from the pressure vessel through the inlet passage through the disc to the outlet passage in the outlet of the valve.

22 Claims, 10 Drawing Sheets

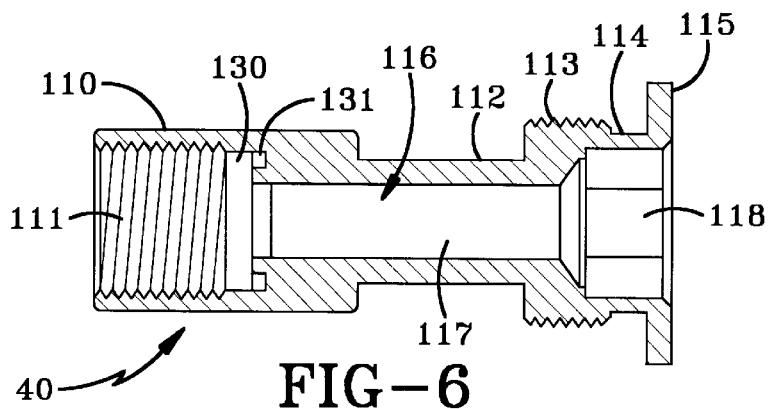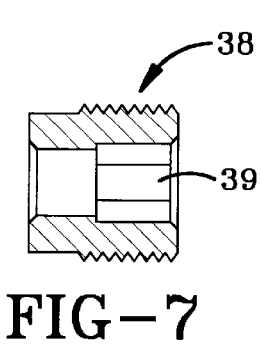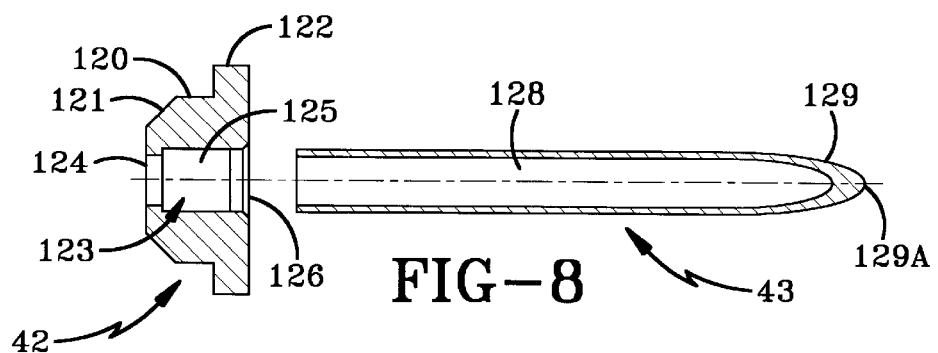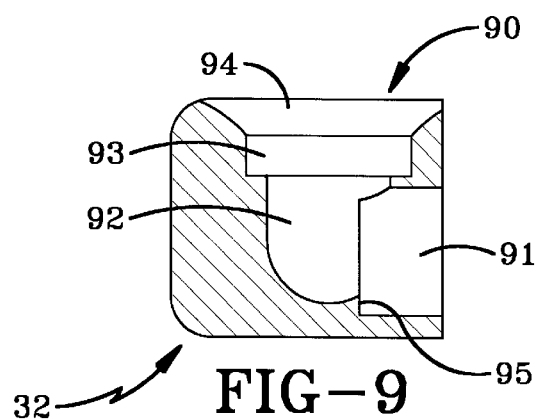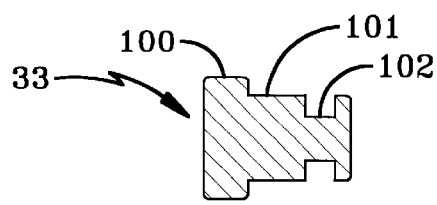

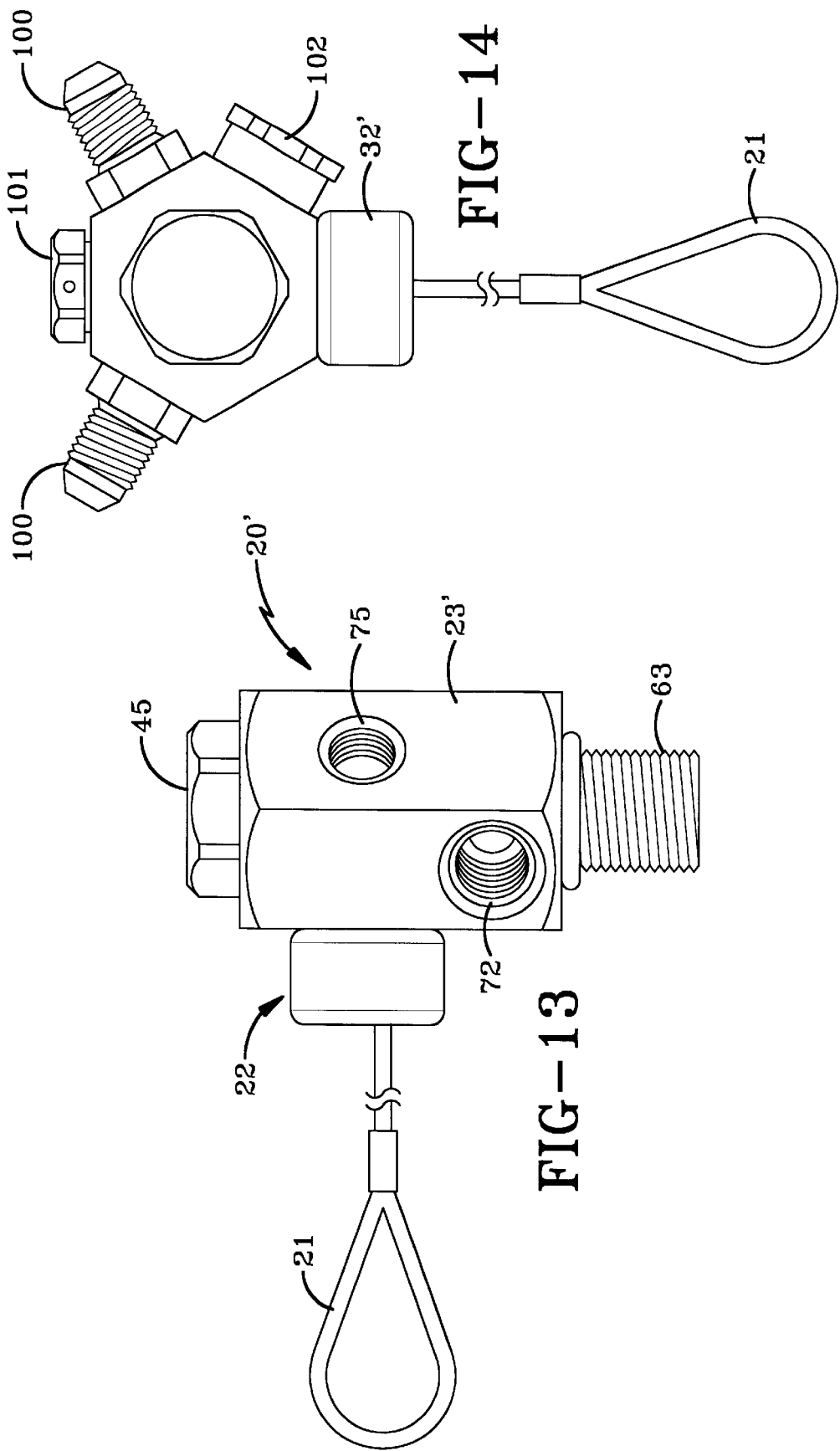

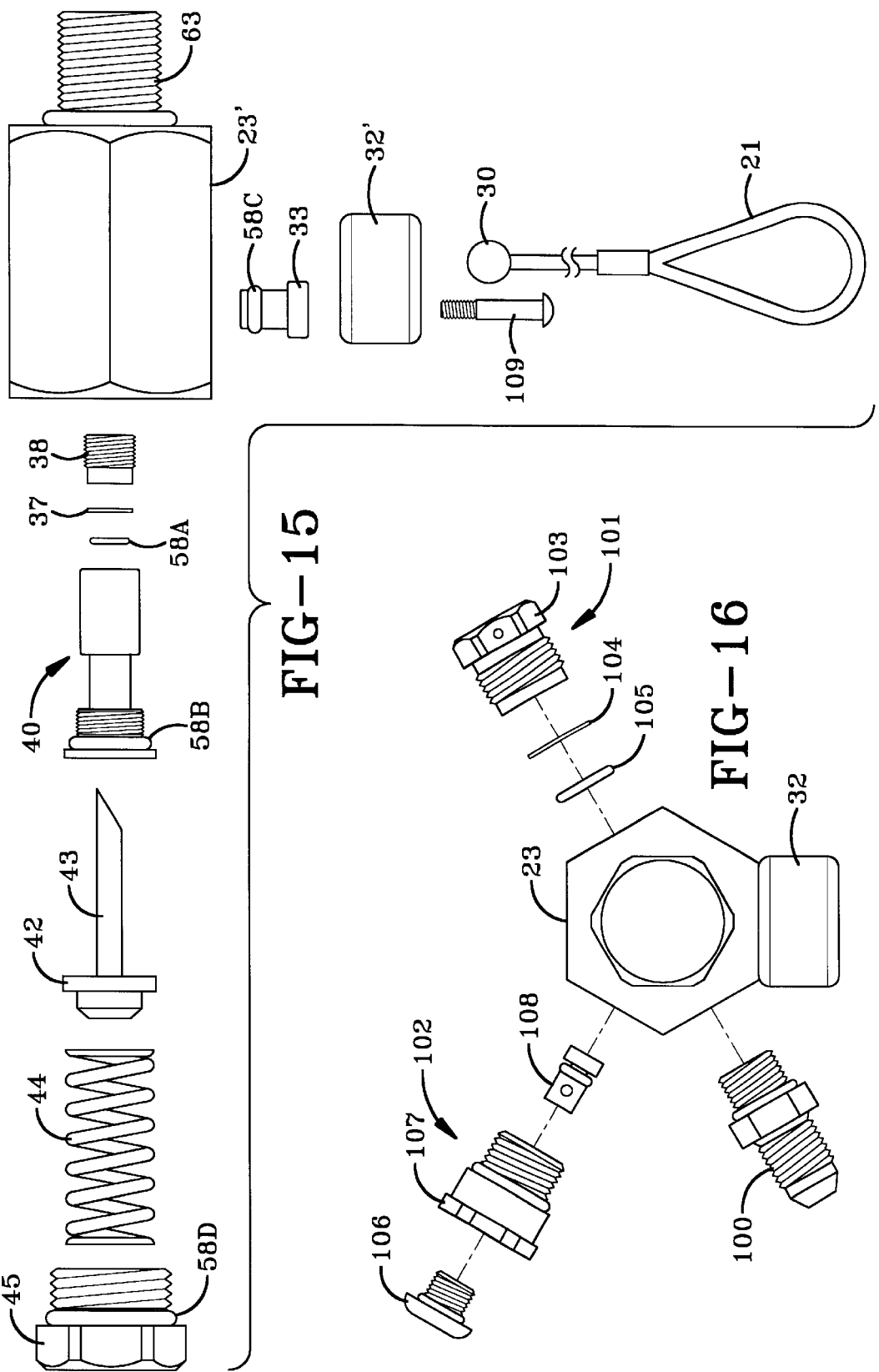

PUNCTURE DISC RAFT INFLATION VALVE HAVING A ONE-PIECE VALVE BODY

This application claims benefit of U.S. Provisional Application Ser. No. 60/049,702 Jun. 16, 1997.

BACKGROUND OF THE INVENTION

1. Technical Field

The present invention relates to inflation equipment for inflatable devices, and particularly to inflation valves as used thereon. More particularly, the present invention is an improved inflation valve of a puncture disc or "cutter" design for use with inflatable devices such as life rafts and escape slides. Specifically, the present invention is an improved inflation valve of a one-piece valve body design utilizing a puncture disc "cartridge" in conjunction with a livestock or hypodermic needle that is used as a bayonet for puncturing the disc whereby the valve is constructed in this "one piece" design for enhanced reliability and lower production and assembly costs.

2. Background Information

Inflatable life rafts have found wide use on ocean-going ships and aircraft as emergency flotation devices. An inflatable life raft offers the advantage of being light weight and of a small deflated size thereby providing an optimal safety device on ships and aircraft where space and weight are important considerations. Specifically, the deflated and packed life raft is stored in its deflated and packed condition for long periods of time when it is not needed, yet it can be inflated rapidly when it is needed to form a raft capable of holding people.

Inflatable life rafts are inflated using a pressurized inflation gas (such as carbon dioxide, dry air, or nitrogen) which is contained in a pressure tank or pressure vessel that is typically folded within the folded raft. When the raft is to be inflated, a valve is actuated by pulling a pull cable. The pull cable is connected at one end to the valve actuating mechanism in such a manner as to allow the cable to pull free after the firing mechanism has been actuated. When the pull cable is pulled, the actuating mechanism fires the valve causing it to open thereby permitting the pressurized fluid to expand and fill the life raft.

Of all of the various valve designs that have been used since life rafts were invented in the early 1940's, "puncture disc" design units have proven to be the most field reliable. This valve design uses a thin metal disc (the "puncture disc") which normally blocks the passage connecting the inlet of the valve (attached to the pressure tank) to the outlet of the valve (attached to the deflated raft). A bayonet or spear is provided for contacting and piercing an opening in the disc. An actuation mechanism is provided for moving the bayonet toward a collision with the disc that is sufficiently forceful to pierce or puncture open the disc. Gas then flows from the pressure tank through the inlet, through the passage, and through and/or around the hollow bayonet positioned in the rupture in the puncture disc to the outlet and then to the inflatable article, such as a life raft.

Puncture discs of various kinds have been proposed in the past. Examples of puncture disc inflation valves are shown in the following U.S. patents. Hinchman U.S. Pat. No. 2,120,248; Davis U.S. Pat. No. 3,266,668; Bernhardt et al. U.S. Pat. No. 3,526,339; Martin U.S. Pat. No. 3,757,371; McDaniel et al. U.S. Pat. No. 3,887,108; Milgram U.S. Pat. No. 3,938,704; Legris U.S. Pat. No. 4,356,936; and Mackal U.S. Pat. No. 4,475,664.

Prior art puncture disc valves were bulky and therefore often difficult to package. In addition, these prior art puncture disc valves are often hard or very inconvenient to charge or fill because of the difficulty of bypassing the sealing disc without damaging or contaminating the disc seal.

In response to industry requests for improved field reliability, Mirada Research & Manufacturing designed and patented a two part Improved Raft Inflation Valve as disclosed in U.S. Pat. No. 4,959,034. In general, this valve included a cutting head disposed on a bayonet piston for cleanly puncturing a puncture disc. This valve was designed and constructed with a two part valve body. Specifically, the valve body is a cylinder head and a firing head. This and other prior art designs all incorporate two or more piece valve bodies which have provided the necessary interior access to the disc cavity but which are expensive to manufacture.

In addition to expense, the puncture disc inflation valves with multiple part valve bodies are susceptible to poor assembly or inaccurate part insertion. Specifically, as to the '034 inflation valve, it has been found that in the rare case of a valve failure, such failure is almost, if not always, attributed to either poor assembly or re-assembly of the two part valve body or insertion of too many puncture discs (that is, more than one).

This '034 valve has become a very popular valve in the inflation valve industry. The field performance and reliability of the '034 valve is highly acclaimed in the inflatable industry where the '034 valve (and other puncture disc type inflation valves) continue to routinely outperform all other non-puncture disc design inflation valve types. In addition, although the '034 puncture disc valves provide user friendliness and ease of repair unmatched by its non-puncture disc counterparts, these valves do require proper assembly and assurance of the correct number of discs for proper and reliable field performance.

In addition, although puncture disc valves provide superior performance over non-puncture disc valves, some raft builders still use non-puncture disc valves for several reasons. These reasons are primarily cost, weight, and specific design constraints, configurations and limitations. Therefore, a new design of a puncture disc valve is needed to satisfy these concerns of the raft builders not using puncture disc valves as well as the other listed disadvantages and concerns as to current puncture disc designs.

OBJECTIVES AND SUMMARY OF THE INVENTION

It is an objective of the present invention to provide an improved inflation valve.

It is further an objective of the present invention to provide an improved raft inflation valve.

It is further an objective of the present invention to provide an improved inflation valve of a bayonet design.

It is further an objective of the present invention to provide an improved inflation valve of a puncture disc design.

It is further an objective of the present invention to provide an improved raft inflation valve that incorporates a one-piece valve body design.

It is a further objective of the present invention to provide an improved raft inflation valve that eliminates or reduces poor or improper assembly by reducing the number of parts including valve body parts.

It is a further objective of the present invention to provide an improved raft inflation valve that incorporates a cartridge with the puncture disc therein for complete insertion and/or replacement without valve body disassembly.

It is a further objective of the present invention to provide a valve design that reduces or eliminates the risk of an end-user inserting more than one puncture disc within the valve body since the disc is installable in the cartridge at manufacture and the cartridges are interchangeable in their entirety within the valve body.

It is further an objective of the present invention to provide an improved inflation valve that uses a puncture disc in conjunction with a sharp object such as a bayonet to provide for "on demand" inflation.

It is further an objective of the present invention to provide an improved inflation valve that is of a one-piece body design and uses a bayonet to puncture a puncture disc to provide for "on demand" inflation.

It is further an objective of the present invention to provide an improved inflation valve of a reduced cost.

It is further an objective of the present invention to provide an improved inflation valve in which the bayonet and bayonet spring is completely isolated from any environmental contamination.

It is further an objective of the present invention to provide an improved inflation valve with a reduced number of parts.

It is always an objective of the present invention to improve field reliability in any manner possible including by reducing the risk of environmental contamination, reducing the number of parts, etc.

It is further an objective of the present invention to provide all of the above objectives in the same improved inflation valve.

Still other advantages and benefits of the invention will become apparent to those skilled in the art upon a reading and understanding of the following summary and detailed description.

Accordingly, the present invention satisfies these and other objectives. Specifically, the present invention relates to a puncture disc raft inflation valve having a one-piece valve body that houses the disc for selective puncture by a bayonet when inflation is desired.

BRIEF DESCRIPTION OF THE DRAWINGS

Preferred embodiment of the invention, illustrative of the best mode in which applicant has contemplated applying the principles, are set forth in the following description and is shown in the drawings and is particularly and distinctly pointed out and set forth in the appended claims.

FIG. 6 is a sectional view of the puncture disc cartridge taken along the central longitudinal axis thereof;

FIG. 7 is a sectional view of the puncture disc retainer taken along the central longitudinal axis thereof;

FIG. 8 is a sectional view of the bayonet hub taken along the central longitudinal axis thereof;

FIG. 9 is a sectional view of the pull cable retainer taken along the central longitudinal axis thereof;

FIG. 10 is a sectional view of the trigger piston taken along the central longitudinal axis thereof;

FIG. 13 is a side elevational view of an alternative embodiment of the improved inflation valve where the pull cable is a straight pull;

FIG. 14 is a top plan view of the valve of FIG. 13;

FIG. 15 is a side exploded view of the valve of FIGS. 13–14;

FIG. 16 is a top exploded view of the valve of FIGS. 13–14;

Similar numerals refer to similar parts throughout the drawings.

DESCRIPTION OF THE PREFERRED EMBODIMENT

Figure 1:
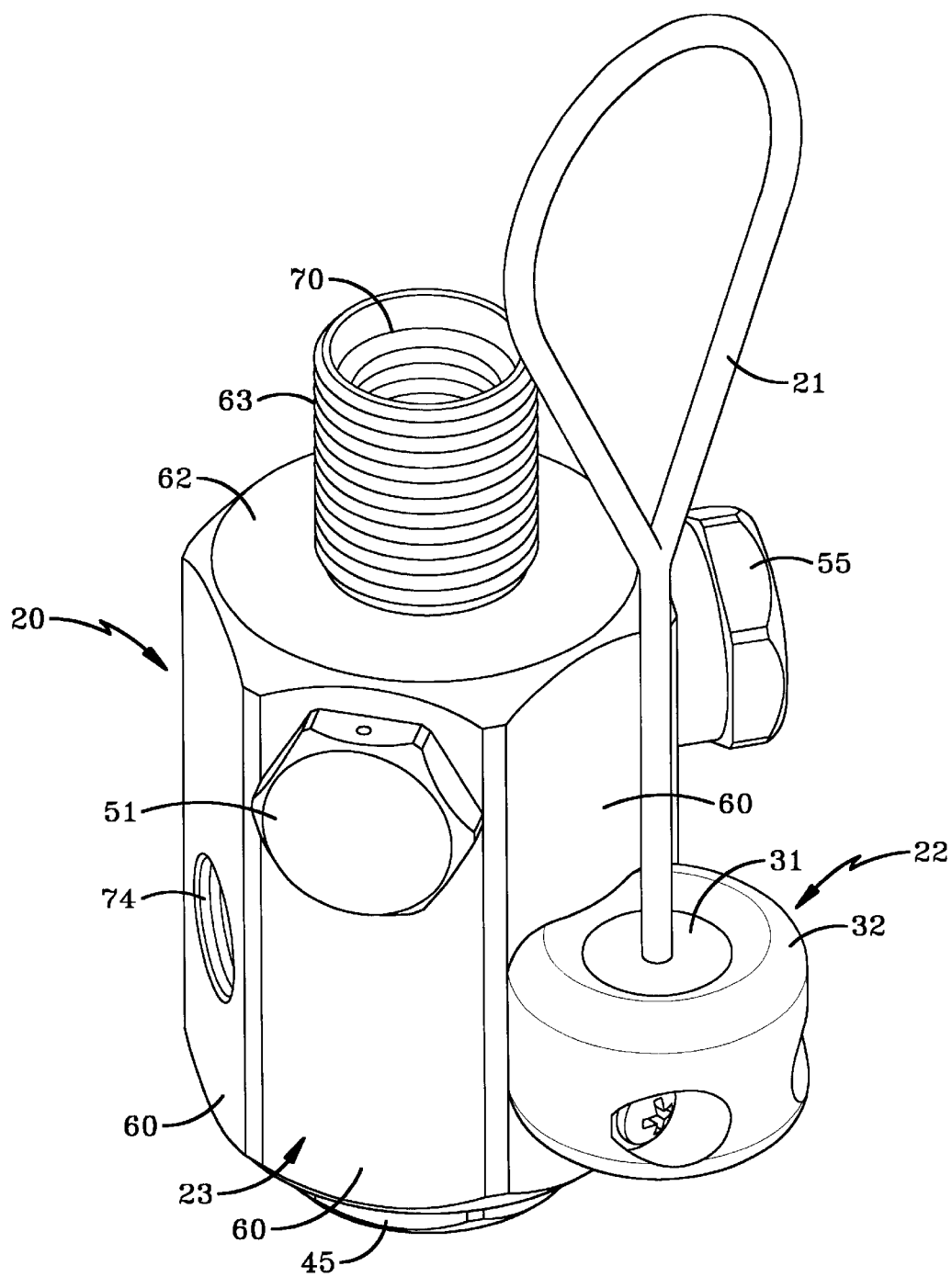
FIG. 1 is a perspective view of the improved inflation valve.
Figure 1A:
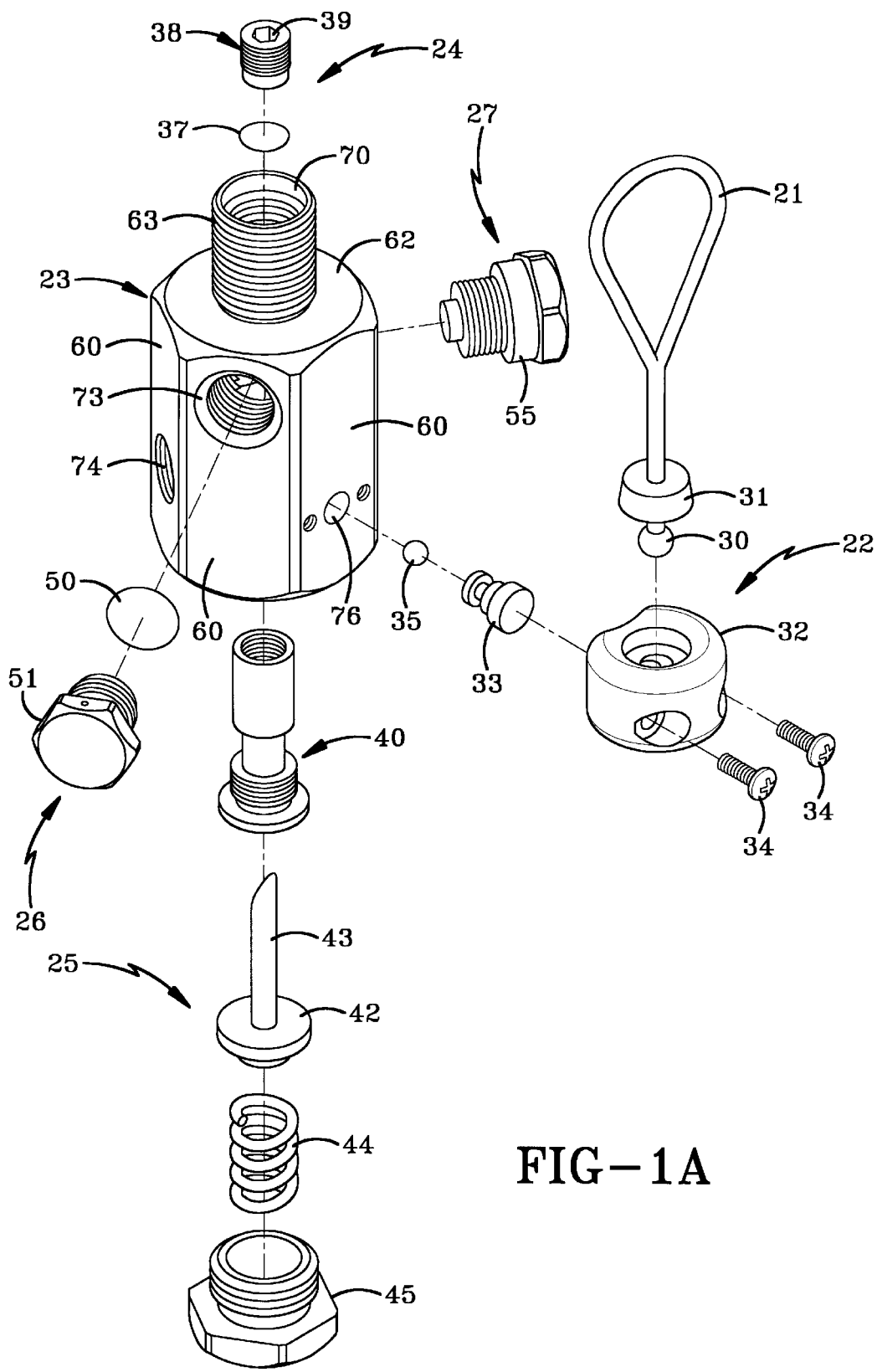
FIG. 1A is an exploded perspective view of the improved inflation valve.
Figure 2:
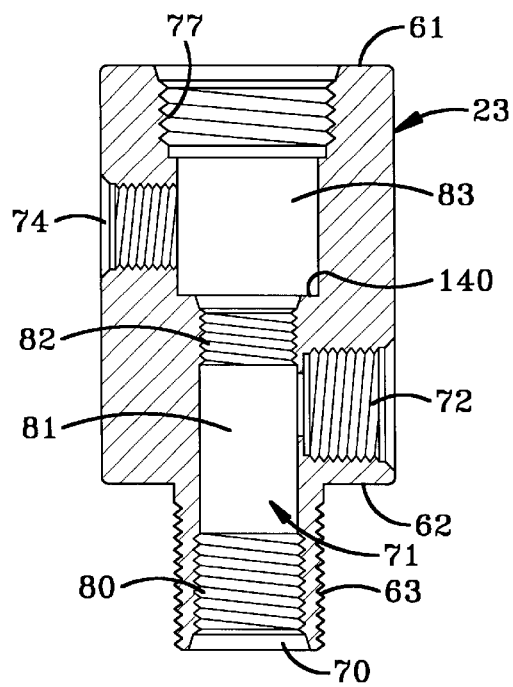
FIG. 2 is a side sectional view of the valve body taken along line 2—2 in FIG. 1.
Figure 3:
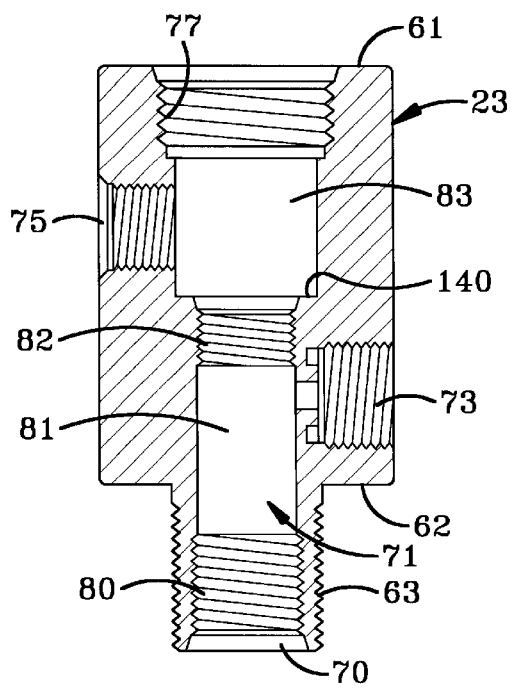
FIG. 3 is a side sectional view of the valve body taken along line 3—3 in FIG. 1.
Figure 4:
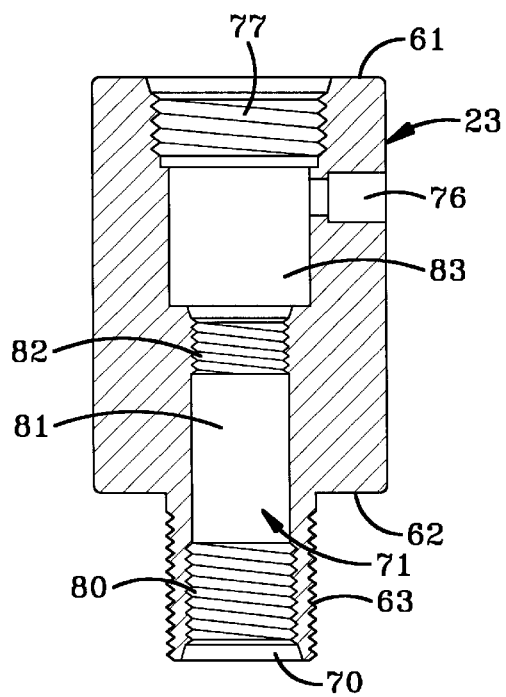
FIG. 4 is a side sectional view of the valve body taken along line 4—4 in FIG. 1.
Figure 5:
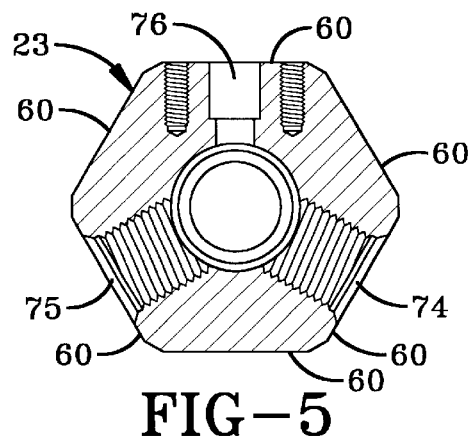
FIG. 5 is a top sectional view of the valve body taken along line 5—5 in FIG. 1.
Figure 5A:
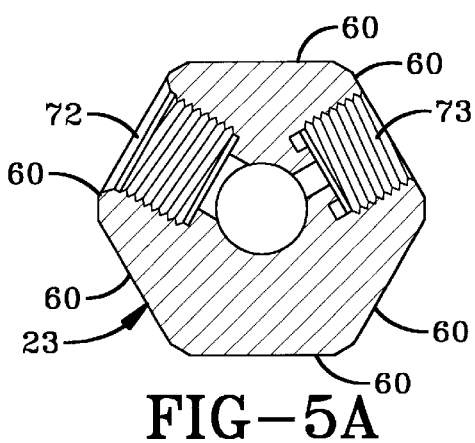
FIG. 5A is a top sectional view of the valve body taken along line 5A—5A in FIG. 1.
Figure 11:
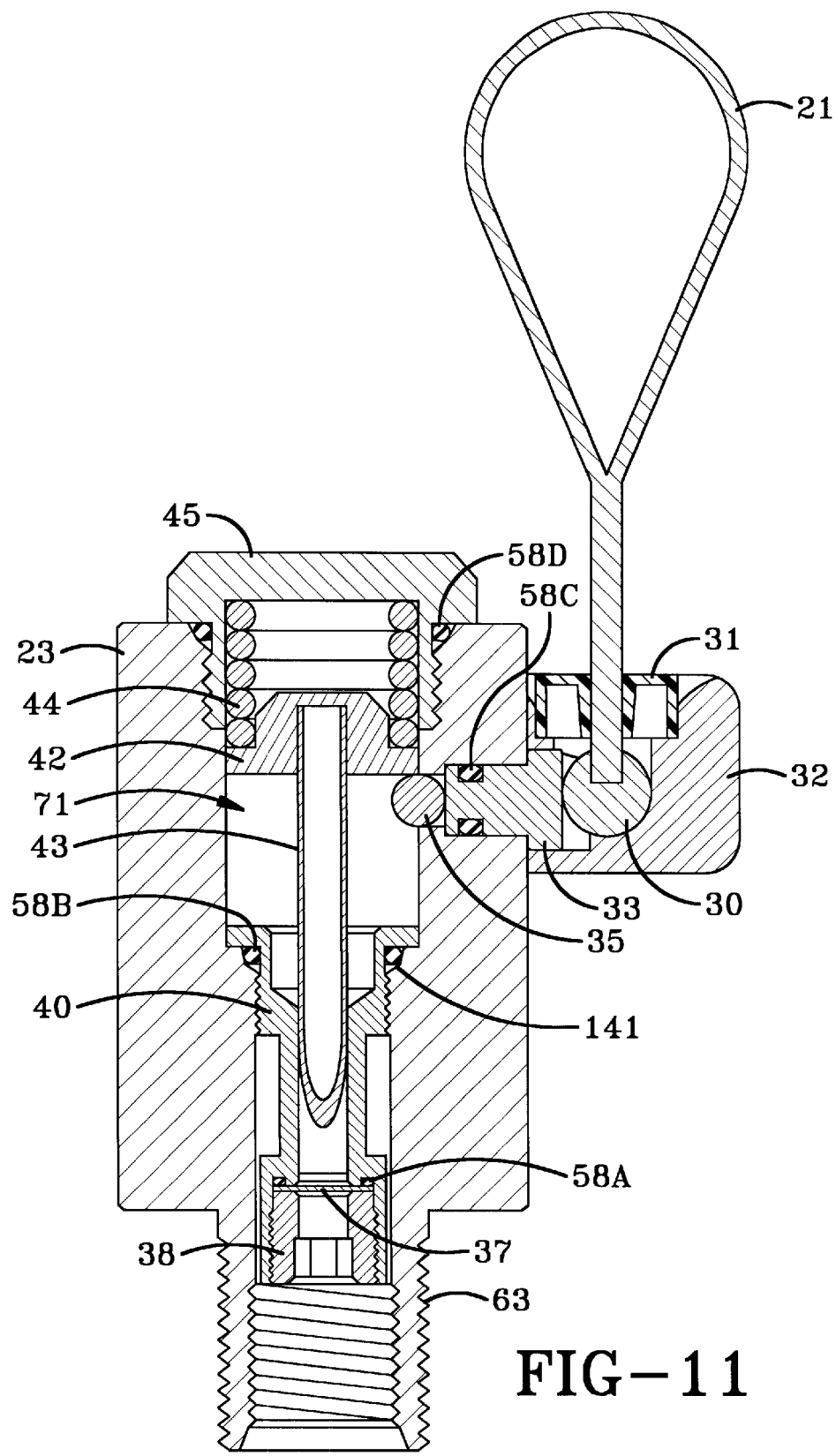
FIG. 11 is a sectional view of the inflation valve taken along the elongated passage in the valve where the inflation valve is in a loaded position, that is one ready for inflation of an inflatable device.
Figure 12:
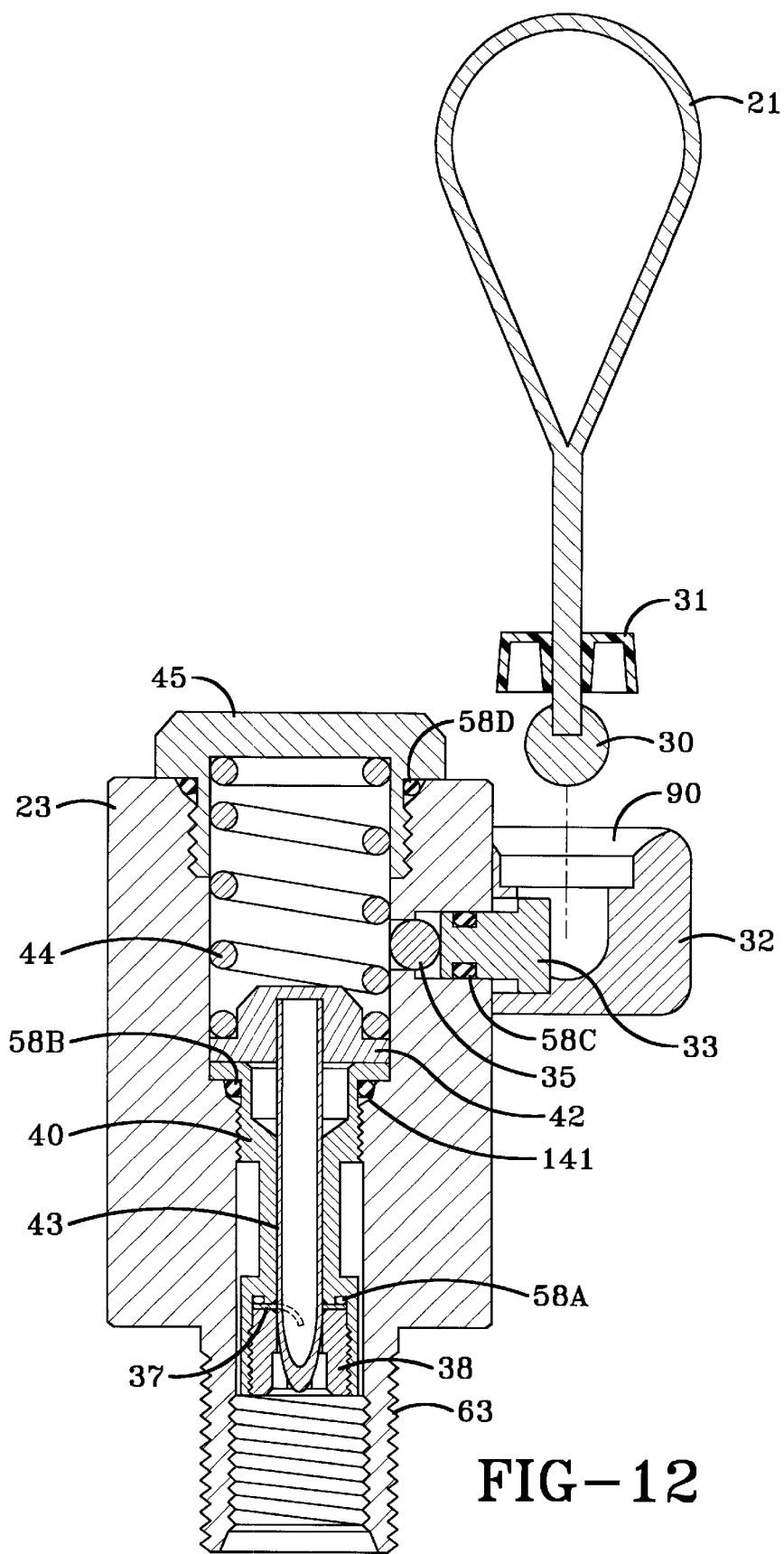
FIG. 12 is a sectional view of the inflation valve taken along the same elongated passage in the valve where the inflation valve is in a fired position, that is the bayonet has been fired through the puncture disc thereby allowing pressurized fluid through the valve for inflating purposes.

The improved inflation valve 20 is shown in the Figures, and is particularly shown assembled in FIG. 1, exploded in FIG. 1A, in part in FIGS. 2–10, ready for use in FIG. 11, and after use in FIG. 12. Inflation valve 20 is usable with any type of inflatable device such as an inflatable life raft (as shown in the drawings and described hereinafter by way of example) or escape slide (not shown). Specifically, the inflation valve 20 is fluidly connected to both the inflatable life raft and a pressurized gas source whereby the valve 20 functions to prohibit pressurized gas flow from the source to the raft until the valve is fired, actuated, or otherwise opened whereby the inflation device is inflated.

A common example is as follows. The pressurized gas used to inflate the life raft is generally supplied from one or more pressure vessels or tanks which are attached to and carried by the raft. The pressure tank is typically a metal or metal lined fiberglass tank which contains an inflation gas (generally carbon dioxide, dry air, or nitrogen) stored under pressure. Each pressure tank has a raft inflation valve 20 attached at one end. Under normal storage conditions, the life raft is substantially evacuated so as to be deflated, folded and stored in a compact package. A pull cable 21 is pulled to actuate or fire valve 20, which causes valve 20 to open, thus allowing inflation gas from the pressure tank to pass through valve 20 into the interior of life raft.

Inflation valve 20 includes pull cable assembly 22, a hexagonal one-piece valve body 23, a disc assembly 24, a bayonet assembly 25, a safety relief assembly 26, and a fill assembly 27. Pull cable assembly 22 includes pull cable 21 with a pull cable ball 30 attached thereto, a seal 31, a pull cable retainer 32, a trigger piston 33, attachment screws 34, and a stop ball 35. Disc assembly 24 includes a puncture disc 37 and a hollow disc retainer 38. Bayonet assembly 25 includes a puncture disc cartridge 40, a bayonet hub 42, a bayonet 43, a bayonet spring 44, and a spring retainer cap 45. Safety relief assembly 26 includes a burst disc 50 and a threaded cap 51 such as one similar to the safety relief in U.S. Pat. No. 4,959,034 which is hereby incorporated by reference. Fill assembly 27 includes a fill fitting 55 such as one similar to the fill fitting in U.S. Pat. No. 4,959,034 which is again hereby incorporated by reference. Various seals or O-rings 58 are used throughout the system to seal the valve as needed.

In accordance with one of the main features of the invention, the valve body 23 is one-piece with a removable cartridge 40 as described below. All of disc assembly 24 and bayonet assembly 25 seats within cartridge 40 thereby defining a removable, wholly assembled replacement piece which is readily replaceable after firing or failure without disassembly of valve body 23.

Hexagonal valve body 23 includes six generally similar sides 60, a first end 61, and a second end 62 opposed to the first end and having a threaded neck portion 63 extending therefrom. The threaded neck 63 has an inlet port 70 therein which transforms into an inlet passage 71 in which the disc assembly 24 and bayonet assembly 25 are housed and that is in fluid communication with a fill port 72, a safety relief port 73, a pair of outlet ports 74 and 75, a piston bore 76, and a threaded recess 77 in end surface 61.

In accordance with one of the features of the invention, the valve body 23 is a one-piece body. This one-piece design is critical in that all seals are eliminated as previously needed to connect the valve body parts together and thus leakage is eliminated from the actual valve body. Also, poor or incorrect assembly of the valve body is eliminated.

Threaded neck 63 mates with a threaded receptacle in the pressurized tank as is shown in U.S. Pat. No. 4,959,034 and hereby incorporated by reference. An O-ring (not shown) provides a seal between second end 62 and the receptacle. As a result, inlet port 70 is in fluid communication with the interior of the tank, and inlet passage 71 extends from inlet 70 to recess 77.

As best shown in FIGS. 2–5 and 11–12, inlet passage 71 includes inlet port 70, an internal threaded portion 80, a cartridge housing portion 81 of which a portion 82 is threaded, a loaded bayonet and spring housing portion 83, and a threaded cap receiving portion referred to above as threaded recess 77. Each of fill port 72, safety relief port 73, outlet ports 74 and 75, and piston bore 76 extend radially inward to inlet passage 71 along its length from inlet 70 to recess 77. Specifically and preferably, fill port 72 and safety relief port 73 are radially aligned in a plane and proximate threaded neck 63 within cartridge housing portion 81, while outlet parts 74 and 75, and piston bore 76 are radially aligned in a plane and proximate recess 77 within loaded bayonet and spring housing portion 83.

In general, puncture disc 37 closes inlet passage 71 so that in the normal, unactuated state of valve 20 (as shown in FIG. 11), gas flow out of the tank is prevented. Puncture disc 37 is held in place by disc retainer 38, which has external threads which mate with the internal threads of puncture disc cartridge 40 as described below. Retainer 38 has an interior passage 39 which is aligned with inlet passage 71 and which exposes the central portion of puncture disc 37.

Puncture disc 37, disc retainer 38, and puncture disc cartridge 40 as well as the other parts of valve 20 may be of varying designs, configurations, shapes, and sizes that will function to provide an inflation valve with a one-piece body and having a pull cable for actuating a bayonet to pierce a puncture disc. In the preferred embodiment, the parts of the valve are embodied as follows.

Pull cable 21 is a cable of any type such as an elongated cable with a looped end as is shown in the Figs. Affixed to one end of pull cable 21 is a body which functions to prohibit or block movement of another body. In the preferred embodiment, this body is ball 30 which is round to prevent it from catching an any surface during movement. The pull cable may extend axially along the valve body as shown in FIGS. 1–12, or alternatively in a radial or straight manner as shown in FIGS. 13–16.

Pull cable retainer 32 is shown in more detail in FIG. 9. Pull cable retainer 32 includes a ball port 90 and a piston port 91. Ball port 90 includes a semi-capsule shaped base 92, an oversized cylindrical area 93, and a conical or funnel shaped entry area 94. The cylindrical area 93 receives seal 31 while the semi-capsule shaped base 92 receives ball 30. Piston port 91 intersects semi-capsule shaped base 92 in a manner perpendicular to the ball port 90 whereby a stop 95 is defined. Piston port 91 is sized so as to receive trigger piston 33.

Trigger piston 33 as shown in FIG. 10 is a movable body that is a cylinder with an enlarged head 100 and a cylindrical body 101 with an annular groove 102 therein. The head 100 is larger in diameter than the body 101, while the groove 102 is smaller in diameter than both the head 100 and body 101. The groove 102 is for receiving a seal or O-ring.

Puncture disc 37 is a cylindrical disc of a material and thickness sufficient to withstand and seal under standard pressures provided by pressurized gas tanks while also being pierceable as needed by bayonet 43 as driven by spring 44. Puncture disc 37 may be metal, plastic, or any other material; and in the preferred embodiment is a metal disc.

Puncture disc retainer 38 as shown in FIG. 7 is a hollow cylinder having an interior passage 39 extending axially from end to end. The interior passage 39 is in part hexagonal or octagonal so as to receive a tool such as an Allen wrench for tightening of the retainer 38 within the cartridge 40. The remainder of the interior passage 39 is cylindrical. The exterior surface of the retainer is threaded in part as described above to thread within the cartridge 40, while the remainder of the exterior of the retainer is smooth walled.

Puncture disc retainer 38 is threadable into puncture disc cartridge 40. Puncture disc cartridge 40 as shown in FIG. 6 specifically includes a cylindrical retainer receiving portion 110 with an axially inward extending threaded chamber 111, a first reduced diameter neck portion 112, an exterior threaded mid-section 113, a second reduced diameter neck portion 114, and a flange 115. Cartridge 40 further includes a passage 116 axially extending from chamber 111 to flange 115. This passage 116 includes axially inward extending threaded chamber 111, a narrow tube 117, and a funnel or other bayonet aligning shaped entrance 118.

Bayonet hub 42 as shown in FIG. 8 is a seat for securely holding bayonet 43. Bayonet hub 42 includes a base portion 120 with a tapered part 121 and a flange 122. A passage 123 extends axially through the bayonet hub and includes a smaller diameter portion 124 nearest tapered part 121 that functions as a bayonet stop, a center cylindrical portion 125, and a tapered outer lip 126 for receiving the bayonet.

Bayonet 43 as shown in FIG. 8 is an elongated sharp object, preferably a needle such as a livestock or hypodermic needle with a hollow interior passage 128 therein from end to end. Bayonet 43 further includes a tapered end 129 with a sharp point 129A as shown best in FIG. 1A.

In assembly, puncture disc 37 is inserted within chamber 111 so as to seat against face 130 and hold an O-ring 58A within groove 131. Disc 37 covers passage 116. Disc retainer 38 is threadably inserted behind disc 37 until tight against disc 37 thereby sandwiching disc 37 between face 130 and disc retainer 38. This disc and retainer assembly is clearly shown in FIG. 11. The cartridge 40 with disc 37 therein is a stand-alone structure that is readily insertable and removable from the one-piece valve body 23 as is needed to install it or replace it without any disassembly of the valve body 23. Since the disc 37 is always pre-installed in the cartridge 40 at manufacture of the cartridge, there is no chance of poor assembly or insertion of too many discs by the party replacing a fired or failed disc.

After the disc 37 is secured within the cartridge 40, the cartridge is threadably inserted within inlet passage 71. Cartridge 40 is inserted until flange 115 seats against stop 140 between threaded section 82 and loaded bayonet and spring housing portion 83. A seal 58B is positioned in between flange 115 and the valve body adjacent neck portion 114 in a notch 141.

Ball 35 is then inserted within piston bore 76. As piston bore 76 has a larger diameter outer portion 150 and a smaller diameter inner portion 152, the ball 35 passes through the outer portion 150 to the inner portion 151 where it is prohibited from further entry by a peripheral lip around the innermost part of the inner portion 151 adjacent the loaded bayonet and spring housing portion 83. This is shown in FIG. 11 where the ball 35 extends inward and even extends into the portion 83 but cannot completely pass through the inner portion 151. As a result, the ball 35 hangs into portion 83 but cannot completely enter therein.

Trigger piston 33 is inserted behind ball 35 with a seal 58C in groove 102. Trigger piston 33 pushes ball 35 inward until the innermost end of trigger piston 33 is stopped by the ridge between the larger diameter outer portion 150 and the smaller diameter inner portion 151. This pushes ball 35 partially into the passage 71 thereby blocking a portion of the passage. Head 100 also is stopped by the exterior of the valve body around the piston bore 76 as the head is larger than the bore.

Pull cable retainer 32 is affixed to the exterior of the valve body 23 such that piston port 91 is axially aligned with piston bore 76. Piston port 91, which is diametrically larger than bore 76, receives head 100. Ball 30 is then inserted into ball port 90 to base 93 whereby ball 30 holds head 100 against the exterior of the valve body and away from stop 95. As a result, ball 30 forces ball 35 outward into passage 71 whereby passage of bayonet hub 42 is prohibited. Seal 31 is seated within cylindrical area 93 thereby supporting pull cable 21 and preventing dirt and debris from entering into retainer 32.

Bayonet hub 42 with bayonet 43 extending therefrom is then inserted bayonet first into passage 71. Bayonet hub 42 is inserted until it is blocked by ball 35 as is shown in FIG. 11. During this insertion, bayonet 43 aligns with and enters partially into passage 116 in the cartridge 40 but does not reach disc 37.

Spring 44 is inserted into passage 71 behind hub 42 such that one end of spring 44 seats on base portion 120 of the hub. The other end of spring 44 is then inserted within cap 45 and cap 45 is pushed inward toward passage 71 so as to compress spring 44. Cap 45 is threadably affixed to valve body 23 within recess 77 such that the spring is compressed as is shown in FIG. 11. An O-ring 58D seals the cap to the body. The system is now loaded or ready for firing.

As indicated above, threaded neck 63 is threadably inserted and affixed within the pressure tank as shown in U.S. Pat. No. 4,959,034 which is hereby incorporated by reference. An O-ring seals the valve 20 to the pressure tank as shown in the '034 reference.

At this point, both fill fitting 55 and threaded cap 51 (after insertion of burst disc 50) have been threadably inserted within fill port 72 and safety relief port 73, respectively, with O-rings sealing off any leakage. The fill fitting 55, which is located in fill port 72, may be any type of fill fitting such as the fitting disclosed in U.S. Pat. No. 4,959,034 which is hereby incorporated by reference and includes a fill valve body having a threaded neck which engages threads in fill port 72. As previously indicated, an O-ring provides a seal between cylinder head and the fill valve body.

In general, the fill valve body has an inner cylinder in which a free-floating piston is located. The piston has limited outward movement. As a result, the piston, which slides in the cylinder, has a central passage through which gas can be delivered into the opening, which communicates with the passage and thus with the inlet and the interior of the pressurized tank. An O-ring provide a seal between the piston and the cylinder. Overall, the pressure differential between the interior of the tank and the atmosphere causes the piston to be driven outward and thus prevent the flow of gas out through fill fitting 55. To fill the pressurized tank, a complementary fill fitting (not shown) from a compressed gas source is fitted into the threaded bore of the fill fitting whereby the piston is forced inwardly by the differential pressure so that the passage is exposed to the opening and thus is in communication with the fill port and thus the interior of the tank. Once filling is completed, the pressure to the fill fitting is dropped, so that the pressure differential is reversed. The piston is thus driven outward by the differential pressure to close the passage and prevent the flow of gas out from the tank.

As to burst disc 50 and threaded cap 51, these provide a safety relief which prevents an explosion in the event that gas pressure within the pressurized tank reaches an unsafe level. The safety relief includes the frangible or burst disc 50, the disc retainer nut or threaded cap 51 with a relief vent or hole therein as described in the '034 patent, and typically an O-ring. The disc 50 is located in safety port 73 at the outer end of the safety passage. At its inner end, the safety passage communicates with cartridge housing portion 81 of passage 71. The cap or nut 51 is threaded into safety port 73, and holds disc 50 in a position where it seals safety port 74. If the pressure within the pressurized tank exceeds a predetermined level, disc 50 ruptures. This permits inflation gas to escape from the tank through the ruptured disc 50, and out of one or more discharge vents or relief holes in the cap or nut 51.

At least one of outlet ports 74 and 75 is connected to the inflation device or a fluid tube connected thereto, and similarly contains necessary O-rings to prohibit fluid leakage. In one embodiment, an outlet passage is connected at one end to one of the outlet ports 74 or 75 and at its other end to an outlet fitting. This outlet fitting is then coupled to a hose that is connected to the inflation device (life raft).

In operation, the spring 44 is biasing the bayonet 43 toward the puncture disc 37; however, the ball 35 is restricting the bayonet hub 42 on which the bayonet 43 is attached from moving toward the disc 37. Ball 35 is prohibited from moving out of the path of the hub 42 because the linear space behind the ball is filled by the trigger piston 33 and ball 30. The only degree of freedom is the ball port 90.

To fire the valve thereby causing inflation of the inflatable device, the ball 30 is pulled upward out of piston port 91 into ball port 90 (and often completely out of pull cable retainer 32). This allows the trigger piston 33 to slide outward from the piston bore towards and into contact with stop 95. The ball 35 simultaneously follows the trigger piston 33 because of its round design which transfers some axially exerted force from the hub into radial motion within piston bore 76. The movement of ball 35 out of the path of hub 42 allows the spring 44 to decompress or release from its compressed state thereby causing the bayonet hub 42 and bayonet 43 thereon to be fired or launched toward disc 37. When the bayonet 43 reaches the disc 37, the bayonet pierces disc 37 by initially impinging from a lead or sharp point 129A on the bayonet and thereafter cutting through the puncture disc 37 with the remainder of the sloped cuffing face 129. The pressurized gas within the pressurized tank simultaneously rushes through the cut disc to the outlets 74 and 75 (whereby any inflation device fluidly connected to the outlets is inflated).

Another embodiment of the present invention is shown in FIGS. 13-16 as valve 20'. In this embodiment, the pull cable 21 is radially aligned rather than offset axially aligned as in the above described embodiment, that is the pull cable 21 and pull cable assembly 22 is aligned and thus a straight pull. As best shown in FIG. 15, the valve 20' includes the same parts as valve 20 including pull cable 21, pull cable ball 30, trigger piston 33, and stop ball 35. The difference between valve and valve 20' is the orientation of pull cable retainer 32' and the location of the ports therein which receive the combination of ball 30 and pull cable 21, and the trigger piston 33. As a result, the pull direction is offset axial in the embodiment of FIGS. 1–12 while radial in the embodiment of FIGS. 13–16. In these FIGS. 13–16, actual outlet fittings 100, safety disc retainer 101 and inlet fitting 102 are shown in outlet ports 74' and 75', safety relief port 73', and fill port 72', respectively. FIG. 16 shows these standard parts exploded where safety disc retainer 101 includes a retainer body 103, a safety disc 104, and an o-ring 105, while inlet or fill fitting 102 includes a fill fitting plug 106, a fill fitting body 107, and a fill fitting piston 108. Pull cable retainer 32' is fastened to the body 23' using a fastener 109.

Figure 17:
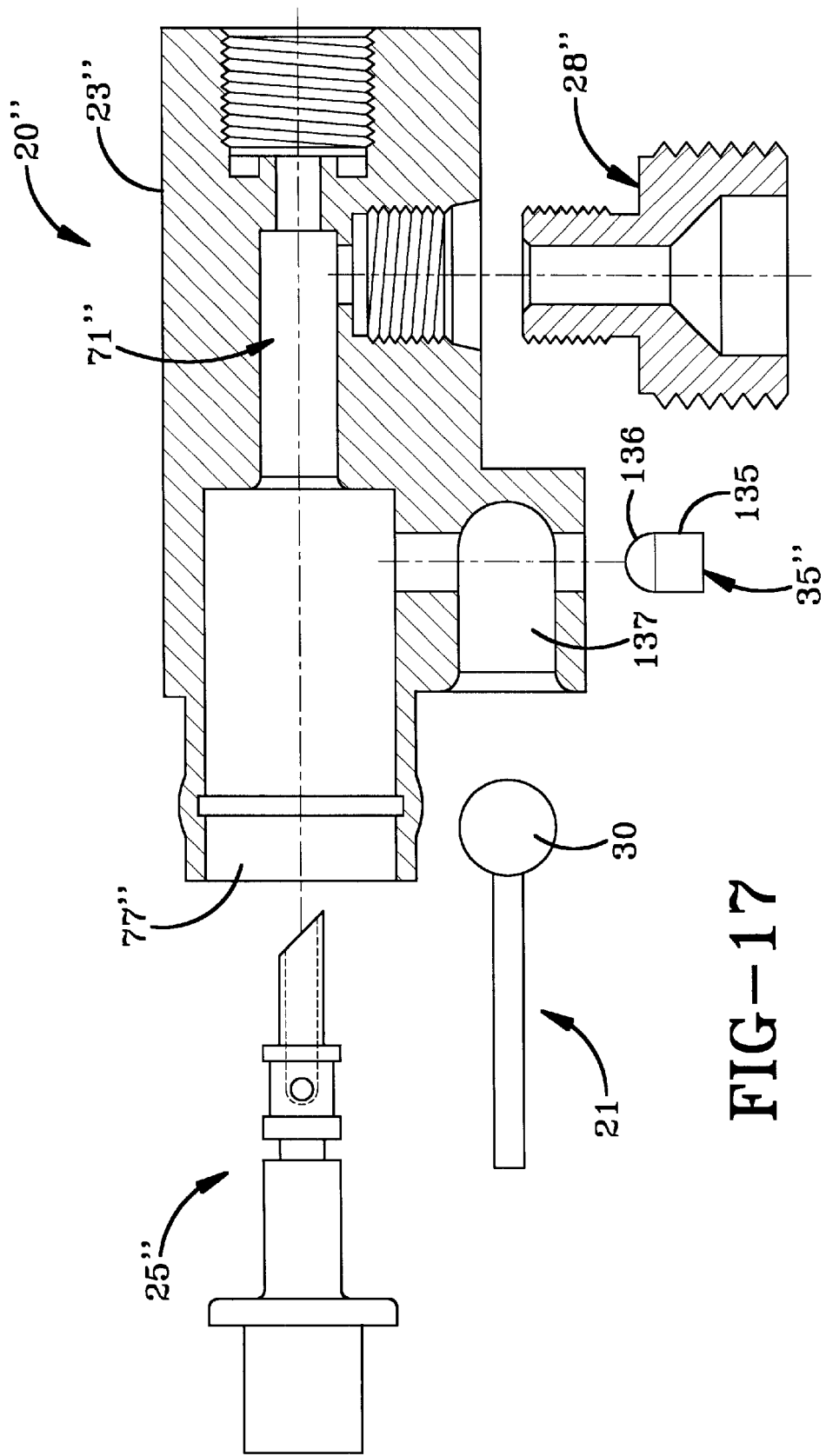
FIG. 17 is a sectional view of yet another embodiment of the improved inflation valve where a hybrid piston/ball is used.

A yet even further embodiment of the present invention is shown in FIG. 17 as valve 20". Valve 20" includes a valve body 23", the disc assembly 24, a bayonet assembly 25", a hybrid piston ball 35", the pull cable 21 and ball 30, and an outlet fitting 28".

Valve body 23" is a one-piece body and is similar to valve body 23 but also includes the pull cable retainer integral therein. The body 23" has a passage axially therethrough just as in the other embodiments which is basically inlet passage 71" and recess 77". As above, disc assembly 24 and bayonet assembly 25 are housed therein and in fluid communication with a port such as a fill port 72" or other ports such as a safety relief port or outlet port.

Hybrid piston ball 35" is a single body combination of the trigger piston and ball. The hybrid piston ball 35" includes a cylinder 135 with a semi-hemispherical end 136. In effect, the hybrid piston ball 35" works just as the combination of the trigger piston and ball function above. To insert the ball 35", the piston bore 76" extends radially outward intersecting and passing through a pull cable passage 137, and extending outward to the exterior surface of the valve body 23" so as to allow for easy insertion of the hybrid piston ball 35" therein. The ball 30 at the end of pull cable 21 holds the hybrid piston ball 35" in the bore 76". Otherwise, the pull cable setup and mechanism is substantially similar to that of the embodiment in FIGS. 1–12.

Figure 19:
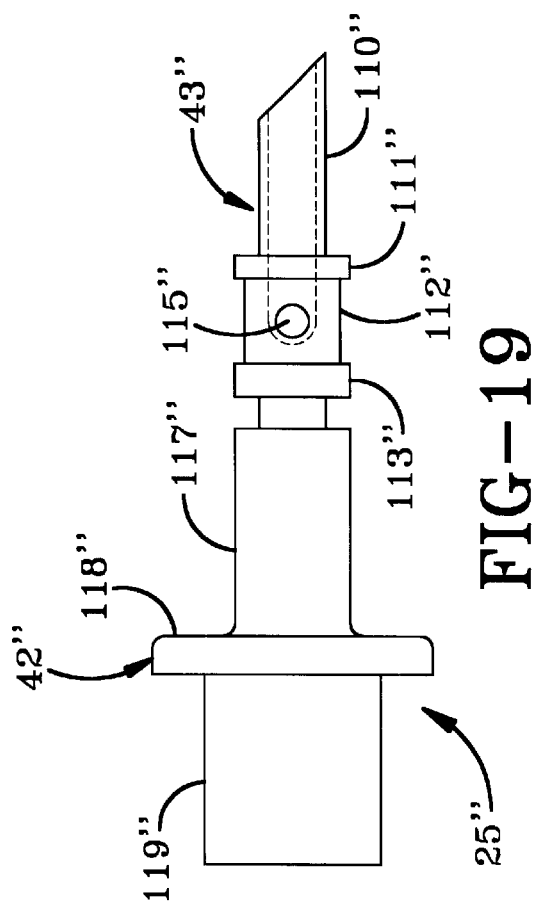
FIG. 19 is a side elevational view of an alternative bayonet as is usable with the improved inflation valve of FIG. 17.
Figure 18:
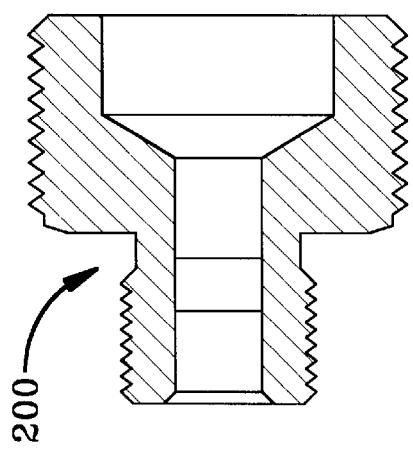
FIG. 18 is a sectional view of an alternative outlet fitting as is usable with the improved inflation valve of FIG. 17.

FIG. 18 shows a modified outlet fitting 200 that is usable with any one of the above described valve bodies. FIG. 19 shows a modified bayonet assembly 25" which includes a bayonet 43" and a bayonet hub 42". The bayonet assembly 25" works substantially similar to the above described bayonet assembly 25; however, this bayonet assembly 25" is a one piece unit machined out of higher strength metal such as high strength stainless steel so as to be better and more reliable at puncturing discs used in $CO_2$ cylinders which are generally stronger.

The bayonet assembly 25" includes two portions, namely a bayonet portion 43" and a hub portion 42". It is of a unique design whereby the bayonet portion includes at least a bayonet 110", a first increased diameter portion 111", a first reduced diameter portion 112", a second increased diameter portion 113" which is of the same or similar diameter to the first portion 111". The first reduced diameter portion 112" includes a hole 115" completely therethrough. After firing and puncture of the disc, the first reduced diameter portion 112" at least axially aligns with the outlet fitting and its port so as to assist in gas flow. It also may radially align. In addition, the overall first reduced diameter portion 112" aligns with the outlet fitting and its port to allow for gas flow around the bayonet.

The hub portion 42" includes a neck 117", a shoulder 118" and a base 119". The shoulder 118" and/or the first increased diameter portion 111" function as stops when the bayonet is fired. Portions 11", 113" and 117" are of approximately the same diameter.

Accordingly, the improved raft inflation valve is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved raft inflation valve is constructed and used, the characteristics of the construction, and the advantageous, new and useful results obtained; the new and useful structures, devices, elements, arrangements, parts and combinations, are set forth in the appended claims.

It is claimed:

1. An inflation valve selectively sealable to a pressurized tank, the valve comprising:
   a one-piece valve body having a gas passage therein, the gas passage extending from a first opening selectively attachable to the pressurized tank to a second opening;
   a replaceable cartridge insertable via the second opening within the gas passage for blocking the gas passage while still allowing for filling of the pressurized tank from a fill port to the first opening, the cartridge including a bayonet guiding bore receiving a punctures disc for preventing the transmission of gas through the gas passage absent the breaking. of the puncture disc;

a bayonet biased toward the puncture disc and movable within the bore in the gas passage for selectively puncturing the puncture disc; and a detent for blocking the bayonet bias and detaining the bayonet from puncturing the puncture disc.

2. The inflation valve of claim 1 wherein the valve body includes a detent passage that transversely intersects the gas passage whereby the detent is selectively movable in the detent passage from a first position where the detent extends into the gas passage to a second position where the detent is completely within the detent passage.

3. The inflation valve of claim 2 further comprising a spring for biasing the bayonet toward the puncture disc.

4. The inflation valve of claim 3 wherein the detent is a ball.

5. The inflation valve of claim 3 wherein the detent is a cylinder with a semi-hemispherical end.

6. The inflation valve of claim 3 further comprising a release mechanism that blocks the detent from moving from the first position to the second position until removal of the release mechanism.

7. The inflation valve of claim 6 wherein the release mechanism includes a pull cable with a blocking ball that blocks the detent from moving from the first position to the second position until removal of the blocking ball from its adjacent position to the detent whereby such removal allows the biasing forces on the bayonet to push the detent out of the gas passage and into the detent passage thereby allowing the bayonet to fire through the puncture disc.

8. The inflation valve of claim 7 wherein a trigger piston is positioned in between the detent and the blocking ball of the pull cable, and the blocking ball is pinned against a stop such that removal of the blocking ball allows the trigger piston and detent to move toward the stop thereby moving the detent out of the gas passage.

9. The inflation valve of claim 8 wherein a retainer with a second detent passage is attachable to the valve body so as to align the detent and second detent passages whereby the stop is in the retainer, and the retainer further including a pull cable passage transverse to the second detent passage and providing for passage of the pull cable from the pinned position between the trigger piston and the stop.

10. The inflation valve of claim 1 wherein the one-piece valve body includes the gas passage which extends axially from the first opening to the second opening and includes at least one radial port intersecting therebetween, the gas passage including a first securing portion therein for holding the puncture disc and a second securing portion therein for receiving the bayonet and a spring for biasing the bayonet toward the puncture disc.

11. An inflation valve selectively sealable to a pressurized tank, the valve comprising:

a one-piece valve body having a gas passage therein which extends axially from a first port selectively attachable to the pressurized tank to a second port and includes at least one radial port intersecting therebetween, the gas passage including a first securing portion and a second securing portion therein;

a replaceable cartridge insertable via the second port and securable within the gas passage at the first securing portion for blocking the gas passage while still allowing for filling of the pressurized tank from a fill port to the first port, the cartridge including bayonet guiding bore receiving a puncture disc for preventing the transmission of gas through the gas passage absent the breaking of the puncture disc;

a bayonet with a hollow interior passage therein for fluid flow is securable within the gas passage at the second securing portion and movable within the bore in the gas passage for selectively puncturing the puncture disc and maintaining an open gas passage once the disc is punctured by remaining pierced through the puncture disc while assuring fluid flow via the hollow interior passage;

a spring positioned within the gas passage for biasing the bayonet toward the puncture disc;

a detent for detaining the spring-biased bayonet from puncturing the puncture disc, the detent being positioned within the radial port whereby the detent is selectively movable in the radial port from a first position where the detent extends at least partially into the gas passage to detain the bayonet from advancement toward the puncture disc to a second position where the detent is completely within the detent passage and removed from detaining the bayonet; and a release mechanism that blocks the detent from moving from the first position to the second position until removal of the release mechanism.

12. The inflation valve of claim 11 wherein the detent is a ball.

13. The inflation valve of claim 11 wherein the detent is a cylinder with a semi-hemispherical end.

14. The inflation valve of claim 11 wherein the release mechanism includes a pull cable with a blocking ball that blocks the detent from moving from the first position to the second position until removal of the blocking ball from its adjacent position to the detent whereby such removal allows the biasing forces on the bayonet to push the detent out of the gas passage and into the detent passage thereby allowing the bayonet to fire through the puncture disc.

15. The inflation valve of claim 14 wherein a trigger piston is positioned in between the detent and the blocking ball of the pull cable, and the blocking ball is pinned against a stop such that removal of the blocking ball allows the trigger piston and detent to move toward the stop thereby moving the detent out of the gas passage.

16. The inflation valve of claim 15 wherein a retainer with a second detent passage is attachable to the valve body so as to align the detent and second detent passages whereby the stop is in the retainer, and the retainer further including a pull cable passage transverse to the second detent passage and providing for passage of the pull cable from the pinned position between the trigger piston and the stop.

17. An inflation valve selectively sealable to a pressurized tank, the valve comprising:

a one-piece valve body having a gas passage therein, the gas passage extending from a first opening selectively attachable to the pressurized tank to a second opening;

a replaceable cartridge insertable via the second opening within the gas passage for blocking the gas passage while still allowing for filling of the pressurized tank from a fill port to the first opening, the cartridge including a bayonet guiding bore receiving a puncture disc for preventing the transmission of gas through the gas passage absent the breaking of the puncture disc; and a bayonet biased toward the puncture disc and movable within the bore in the gas passage for selectively puncturing or otherwise breaking the puncture disc.

18. The inflation valve of claim 17 further comprising a detent for detaining the bayonet from piercing the puncture disc.

19. The inflation valve of claim 18 further comprising a pull cable mechanism that blocks movement of the detent out of the gas passage.

20. The inflation valve of claim 17 wherein the bayonet includes a hollow interior passage therein for maintaining an open gas passage once the disc is punctured by remaining pierced through the puncture disc while assuring fluid flow via the hollow interior passage.

21. The inflation valve of claim 17 wherein the bayonet includes an elongated bayonet portion, a first increased diameter portion, a first reduced diameter portion, and a second increased diameter portion which is of the same or similar diameter to the first portion.

22. The inflation valve of claim 17 wherein the bayonet includes an elongated bayonet portion with a hollow interior passage, a first increased diameter portion with a fluid flow hole therein, a first reduced diameter portion, and a second increased diameter portion which is of the same or similar diameter to the first portion.

* * * * *